United States Patent Office 2,815,519
Patented Dec. 10, 1957

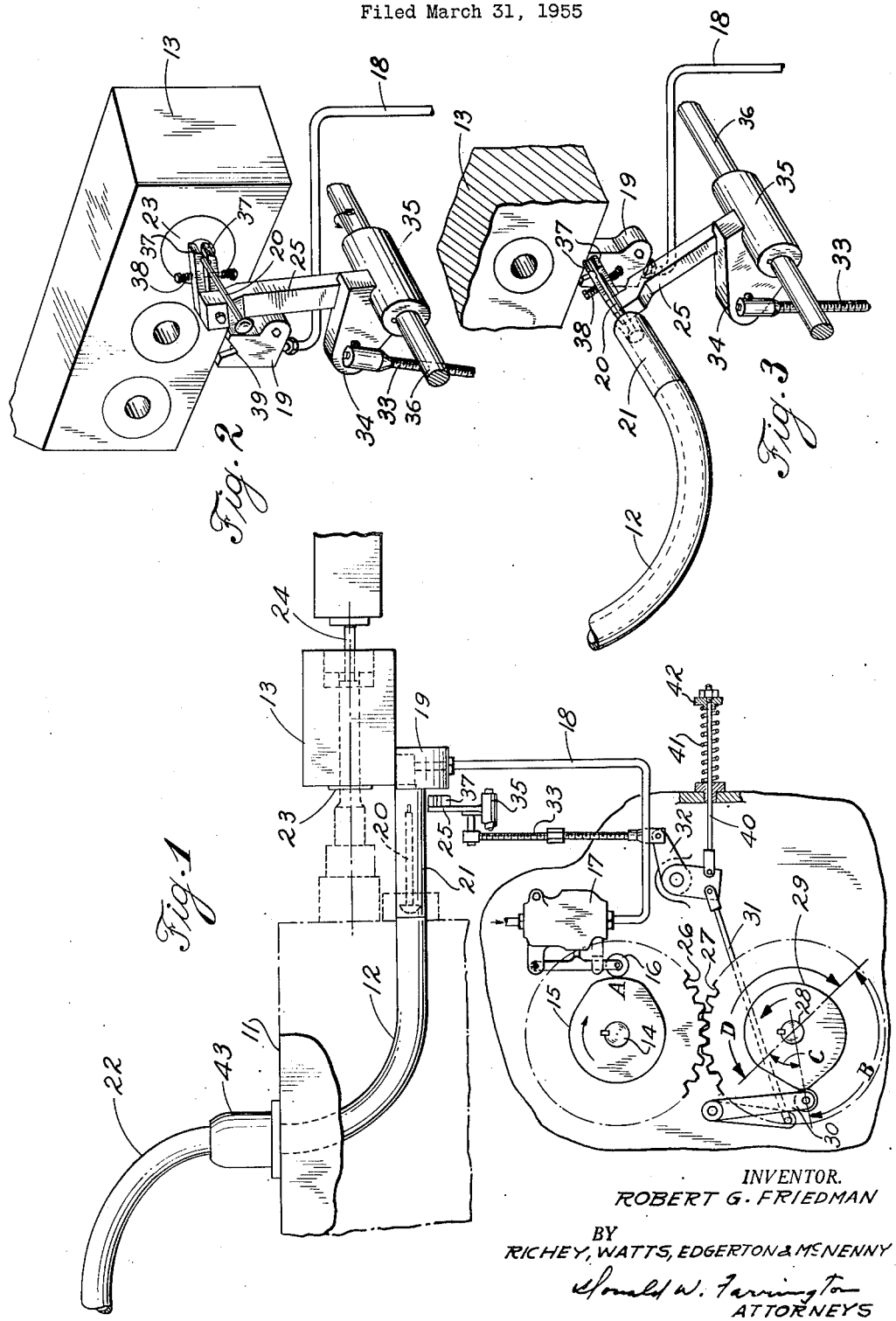

2,815,519

PNEUMATIC TRANSFER MEANS

Robert G. Friedman, Tiffin, Ohio, assignor to The National Machinery Company, Tiffin, Ohio, a corporation of Ohio Application March 31, 1955, Serial No. 498,305

10 Claims. (Cl. 10—11)

This invention relates to machines for making bolts, and similar articles, and to a machine for successively performing a series of operations upon blanks. Particularly, the invention relates to a means for transferring blanks from one station to another of the machine without losing control of the blanks.

Machines for performing a plurality of operations upon blanks cut off from wire or rod stock are illustrated in the patents to Frost, Nos. 2,020,658 and 2,020,659, and in my Patent No. 2,020,660. Machines of the type illustrated in said patents have been arranged, for example, to cut off blanks from suitable stock; upset, extrude and trim the blanks by successive pairs of cooperating tools and dies; transfer the blanks to a pointing mechanism; and then transfer the pointed blanks to a roll threading mechanism. The tools for heading, extruding and trimming the blanks have ordinarily been arranged in horizontal alignment across the face of a reciprocating heading slide, with the cooperating dies correspondingly arranged on the die breast or end portion of the main frame within which the slide is mounted. Suitable means have been provided to transfer the blanks from the cut-off die to the successive extruding and heading dies, such as the transfer mechanism illustrated in the patent to Clouse No. 2,026,823. In the machines illustrated in said Frost Patent No. 2,020,658, and in Friedman Patent No. 2,020,660, the last station provided by the cooperating tools on the header slide and bed frame is a trimming station in which the blanks are pushed through a trimming die into a passageway in the header slide from which the blanks are transferred to the pointing mechanism mounted on the side of the bed frame.

It frequently happens that it is desired to form articles in such an automatic machine by a process in which it is not necessary to push the blanks through a trimming die. Such articles may be completed by the operations such as pointing, threading, or both, may be required. In order to utilize a combined machine of the type referred to and illustrated in the aforesaid patents in the manufacture of such articles, it has heretofore been necessary to provide an idle station at which the blanks are ejected axially into a passageway from which they may be transferred to succeeding operations or collected as completed articles.

To provide such an idle station, however, requires increasing the width of the heading slide, with a consequent increase of the spacing between the side members of the frame. Such widening of the machine not only increases the size and cost of the parts in direct proportion to the increase in width, but necessitates superimposing a further increase in the size and cost of the elements of the machine in order to retain the same strength and rigidity. The end portion of the frame, for example, must not only be widened to provide space for the station, but must be increased in section to retain the same strentgh because of the wider spacing of its points of connection to the side frame members. The crankshaft, which reciprocates the heading slide and must withstand as a bending load the heavy pressures of upsetting, is journalled in the frame side members, so that an increase in the spacing of these side members requires a substantial increase in the diameter of the crankshaft. The increase in mass of all of the moving parts increases the bearing loads and inertia loads, thereby reducing the maximum permissible speed of the machine.

Thus the provision of an extra station increases the weight and cost of the machine and decreases the speed and output out of proportion to the mere increase in width, and excessively out of proportion to the results obtained, where the last operation to be performed on the blank by the heading slide is an upsetting or similar operation and the extra station is provided solely to transfer the blanks.

The object of the present invention is to remove the blanks from the last die station to a point where they can be transferred to subsequent operations or positions thereby permitting a machine with a given number of heading stations to be used for carrying out manufacturing processes which heretofore have required an extra station with the consequent increase in cost and weight of the machine. Other objects are to move the blanks downwardly from the final heading station; to combine a pneumatic transfer mechanism operating to move blanks from one working station to another with a transfer means operating to move the blanks in timed relation to the operation of the machine, and to deliver the blanks through a tube in a simple and efficient manner.

Another object of my invention is to remove the blanks from the last station by a transfer mechanism to a station below the die breast in timed relation to the header slide operation.

A particular object of my invention is to provide pneumatic transfer means at the station below the die breast for transporting the bolt blanks through a tube mounted on the header slide.

A further object of my invention is to provide actuation of the transfer mechanism and the pneumatic transfer means in timed relation with the header slide.

Other objects are to move the blanks downwardly in a plane transverse of the motion of the header slide and in timed relation to the header slide to a station provided with pneumatic ejection means which propels the bolt blanks therefrom through a tube mounted on the header slide to another working station.

Another object of my invention is to provide a transfer station which acts as a support for one end of the bolt blank transferred thereto, while a receiving tube on the header slide is moved toward the bolt blank to serve as a support for the other end of the bolt blank.

Other objects and advantages will appear from the following detailed description of a preferred embodiment.

In the drawings:

Fig. 1 is a diagrammatic representation of a machine embodying my novel transfer means;

Fig. 2 is an enlarged view of the bolt blank transfer means in relation to the die station; and Fig. 3 is an enlarged view of the bolt blank transfer means in relation to the air supplied nozzle block.

In Fig. 1 the header slide 11 is shown with tube 21 integral therewith positioned at the extreme of travel of the header slide in relation to the die-breast 13 and die station 23. The header slide 11 having been moved by the rotation of shaft 14 as described in Frost Patent No. 2,020,658 also positions cam 15 affixed to shaft 14 so that the high portion A of the cam engages cam follower 16 which opens air valve 17 to permit the delivery of air through tube 18 to nozzle block 19. The air leaving nozzle block 19 is directed against bolt blank 20 in tube 21 to deliver the blank through tube 21, 12 and 22 to another station, for example, a pointer station such as that described in Friedman Patent No. 2,020,660.

The bolt blank is worked in the die stations of die-breast 13, and is transferred from one to another as by transfer fingers described and disclosed in Clouse Patent No. 2,020,283, but forms no part of the present invention.

The operation of transferring the bolt blank 20 from die station 23 to nozzle block 19 is best described in conjunction with Figs. 2 and 3. The ejection of the bolt blank from die station 23 is performed by ejector 24 operating as described in Clouse Patent No. 2,139,936.

When bolt blank 20 has been partially ejected from die station 23, and the header slide has moved away from the die-breast 13, the arm 25 and fingers 37 operating in timed relation to the header slide are positioned so that fingers 37 grip blank 20. When the blank 20 has been fully ejected from the die station, the arm 25 carrying fingers 37 and blank 20 swings downwardly until the fingers 37 hold the blank 20 in alignment with notch 39 of nozzle block 19. In this position the end of blank 20 engages the notch 39 which projects from the die-breast. With the blank being held in this position by the fingers 37, the tube 21 is telescoped over the head of the blank during the movement of the header slide toward the die-breast. Thus with the blank being supported at each end, the next downward movement of arm 25 causes the spring closed fingers 37 to slip off of the supported blank 20.

The tube 21 is caused to continue movement toward the nozzle block 19 until it is adjacent thereof. With tube 21 in this position, the header slide is in the extreme position toward the die-breast, and as described above, the cam 15 causes the opening of air valve 17, thus releasing sufficient air through tube 18 and block 19 into tube 21 to propel blank 20 through tube 21, tube 12, swivel 23, and tube 22 to the next station, for example, a pointer station.

Thus it can be seen that the arm 25 and fingers 37 move to three positions. The first arm position being that at the die station 23 to receive the bolt blank 20. The second position is in aligning the bolt blank at the nozzle blank 19. The third position is when the arm 24 and fingers 37 have swung to the extreme downward position to allow the tube 21 to telescope over bolt blank 20 to adjacent nozzle block 19.

For the arm 25 to move to these three positions it is pivoted at bearing 35 on fixed shaft 36. Additionally, the movement of arm 25 is in timed relation to the shaft 14 so that the transfer of the bolt blank be carried out in accordance with the over-all operation of the machine. This timing is brought about by rotation of shaft 28 by gears 26 and 27 which are in a 1:1 ratio. The cam 29 affixed to shaft 28 thus rotates in timed relation with shaft 14, and is provided with three portions B, C and D. These cam portions determine the three positions described above in conjunction with arm 25, as follows:

A cam engaging member 30 is maintained in contact with cam 29 by the action of spring 41 acting through member 42 on rod 40. Rod 41 is pivotally secured to bell crank 32 as is rod 31 which is pivotally secured at the other end to member 30. As member 30 follows the cam portions, bell crank 32 is positioned by rod 31. An adjustable rod 33 attached to the bell crank at one end is pivotally secured to arm 34 for movement thereof. Arm 25 being in fixed relation to arm 34, and pivoted as at bearing 35 is thus positioned in accordance with the portion of cam 29 engaged by member 30.

When member 30 engages portion C of cam 29, the arm 25 is caused to move from the extreme downward position as shown in Fig. 1, to the extreme upward position as shown in Fig. 2. During the engagement of portion C of the cam by member 30, the blank 20 is fully ejected into fingers 37 by ejector 24. Thus when the cam 29 rotates counterclockwise to portion D, the system actuated by member 30 causes arm 25 and fingers 37 to carry the blank 20 downward until the blank is aligned with nozzle block 19 and the end of the blank engages notch 39 to be supported thereby.

During the dwell at the D portion of cam 29, the header slide 12 advances toward the die-breast carrying with it tube 12 and 21 until the forward end of tube 21 just surrounds blank 20 at its head end. At this time, the cam 29 has rotated until member 30 engages the B portion of the cam, thus causing the system actuated by member 30 to move arm 25 and fingers 37 away from the bolt blank 20. The fingers 37 snap off the blank as the blank is supported at opposite ends by tube 21 and notch 39, respectively. The movement of arm 25 continues in a downward direction so that the fingers 37 are carried clear of the continued forward movement of tube 21 toward nozzle block 19. When the tube 21 has moved adjacent the nozzle block, air is released by air valve 17 through the block 19 as described above, thus propelling the blank through the tube 21, 12 and 22.

Thus it is seen that I have described a novel means for transferring a bolt blank from a position at a die station to a station supplied with air, wherein the actuation of air valve supplying air to the station and the bolt blank is in timed relation with the main shaft and the header slide. Thus a transfer station has been provided without necessitating the widening of the die-breast and the other components of the machine.

It will also be understood that with my novel transfer system it is possible to utilize the last die station for working the blank and at the same time retaining control of the blanks and advancing them in orderly sequence to another operation.

Although I have disclosed a preferred embodiment of my invention it will be understood that various modifications and variations of detail and arrangement of parts may be made without departing from the scope of my invention as defined in the following claims.

What is claimed is:

1. In a machine having a bed frame, a reciprocating header slide, a die breast on said bed frame, the combination including a transfer mechanism comprising an arm carrying gripping fingers, said arm being pivoted on an axis normal to the die breast for swinging movement of a blank transverse to the direction of movement of said slide, said arm being swingable to a position with said fingers aligned with said die to receive a blank ejected therefrom and to a transfer station below the die breast, a receiving tube for blanks mounted on said header slide in alignment with said transfer station, means for releasing and supporting said blank in alignment with said tube and said transfer station and means for effecting successive movement of each of said blanks in the direction of their length from said fingers through substantially the entire length of said tube.

2. In a machine having a bed frame, a reciprocating header slide, a die breast having a plurality of die stations in the same horizontal plane on said bed frame, the combination including a transfer mechanism comprising an arm carrying gripping fingers, said arm being pivoted on an axis normal to the die breast for swinging movement of a blank transverse to the direction of movement of said slide, said arm being swingable to a position with said fingers aligned with said die to receive a blank ejected therefrom and to a pneumatic transfer station vertically spaced below the horizontal plane of die stations of the die breast to deposit said blank at said station, a receiving tube for blanks mounted on said header slide aligned with said transfer station, means for releasing and supporting said blank in alignment with said tube and said transfer station and means supplying air to said transfer station in timed relation to said header slide reciprocation to pneumatically propel said blank through the tube.

3. In a machine having a bed frame, a reciprocating header slide, a die breast on said bed frame, the combination including a transfer mechanism comprising an arm carrying gripping fingers, said arm being pivoted at a point below the die breast for swinging movement of a blank transverse to the direction of movement of said slide, said arm being swingable to a position with said fingers aligned with said die to receive a blank ejected therefrom and to carry said blank to a transfer station below the die, a receiving tube for blanks mounted on said header slide aligned with said transfer station, means for releasing said blanks from said fingers when said blank is supported by said tube and said transfer station, and means for ejecting said blank from said transfer station through the tube when said tube is adjacent the station.

4. In a machine having a bed frame, a reciprocating header slide, a die breast on said bed frame, the combination including a transfer mechanism comprising an arm carrying gripping fingers operating in timed relation to the header slide, said arm being pivoted at a point below the die breast for swinging movement of a bolt blank transverse to the direction of movement of said slide, said arm being swingable to a position with said fingers aligned with a die in said die breast to receive a blank ejected therefrom and to a transfer station below the die breast to deposit said blank at said station, a receiving tube for blanks mounted on said header slide, means for releasing and supporting said blank in alignment with said tube and said transfer station and means for moving blanks in the direction of their length from said station through the tube when said arm is positioned downwardly from said station.

5. In a machine having a bed frame, a reciprocating header slide driven by a main shaft, a die breast having a plurality of die stations in the same horizontal plane on said bed frame, the combination including a transfer mechanism comprising an arm carrying gripping fingers, said arm being pivoted on an axis normal to the die breast for swinging movement of a blank transverse to the direction of movement of the header slide, a cam rotated in timed relation to the main shaft, means engaging said cam for swinging said arm to a position with said fingers aligned with a die station on said die breast to receive a blank ejected therefrom, a transfer support mounted on the die breast in a horizontal plane vertically spaced from said first plane, a receiving tube on the header slide aligned with the transfer support for receiving said blank, said cam engaging means having portions for positioning the fingers carrying the blank in alignment with said transfer support during advance of the header slide tube toward the die breast for deposit and release of said blank thereat.

6. In a machine having a bed frame, a reciprocating header slide driven by a main shaft, a die breast on said bed frame, the combination including, a first cam affixed to said main shaft for rotation therewith, a cam engaging means for opening and closing an air valve in timed relation to the main shaft, means for rotating a second shaft in timed relation to the main shaft, a second cam mounted on said second shaft, a blank transfer means for receiving the blank ejected from the die breast, said blank transfer means including a cam engaging means to move the transfer means arcuately transverse of the header slide movement in accordance with the position of the second cam, a pneumatic transfer station communicating with said air valve, a receiving tube on the header slide aligned with said pneumatic station, said blank transfer means releasing the blank when said blank is supported by the receiving tube and the pneumatic transfer station, whereby continued movement of the header slide toward the die breast causes said tube to telescope over said blank and simultaneously said air valve is opened to pass air through the penumatic transfer station to move the blank along said tube.

7. In a machine having a bed frame, a reciprocating header slide, a die breast on said bed frame, the combination including a transfer mechanism comprising an arm having gripping finger means, said arm being pivotally mounted on an axis normal to the die breast for swinging movement of a blank transverse to the direction of movement of said slide, said arm being swingable to a position with said fingers aligned with said die to grip a blank ejected therefrom, said arm carrying said blank into sequential engagement with a transfer station and a blank receiving tube mounted on the header slide, whereby said tube advancing with the header slide and the transfer station support the blank as the arm continues its swinging movement thereby releasing said fingers from said blank, and said blank is ejected from the transfer station through the receiving tube.

8. In a machine having a bed frame, a reciprocating header slide, a die breast on said bed frame, the combination including a transfer mechanism comprising an arm having gripping members, said arm being pivoted on an axis normal to the die breast for swinging movement of the blank transverse to the direction of movement of said slide, said arm being swingable to a position with said fingers aligned with said die to grip a blank ejected therefrom and to move said blank to a transfer station below the die breast, a receiving tube for blanks mounted on said header slide in alignment with said transfer station, said receiving tube adapted to receive a portion of said blank while the arm positions said blank at said transfer station, said blank being supported between said transfer station and said tube as the arm swings out of the path of the tube thereby releasing said fingers from said blank, and means supplying air to said transfer station in timed relation to said header slide reciprocation to pneumatically propel said blank through the tube.

9. In a machine having a bed frame, a reciprocating header slide, a die breast on said bed frame, the combination including a transfer mechanism comprising an arm carrying gripping fingers, said arm being pivoted at a point proximate to the die breast for swinging movement of a blank transverse to the direction of movement of the slide, said arm being swingable to a position with said fingers aligned with said die to receive a blank ejected therefrom and to carry said blank to a transfer station removed from the die, a receiving tube opening toward the die breast for blanks aligned with said transfer station, means for actuating said arm for telescopically aligning said blanks with said tube at said transfer station and for releasing said blanks thereat, and an air jet aligned with the blank for propelling said blank away from the die breast through the tube when said blank is positioned in telescopic alignment therewith.

10. In a machine having a bed frame, a reciprocating header slide, a die breast on said bed frame, the combination including a transfer mechanism comprising an arm having gripping members, said arm being pivoted on an axis normal to the die breast for swinging movement of the blank transverse to the direction of movement of said slide, said arm being swingable to a position with said fingers aligned with said die to grip a blank ejected therefrom and to move said blank to a transfer station removed from the die breast, a receiving tube for blanks in alignment with said transfer station, means including said transfer arm for telescopically positioning and supporting a portion of the blank within said tube, said gripping fingers being releasable in the last mentioned position of said arm for adapting said blank for transfer through said tube, and means supplying air to said transfer station in timed relation to said header slide reciprocation to pneumatically propel said blank through the tube.

References Cited in the file of this patent
UNITED STATES PATENTS
2,278,103   Friedman _____ Mar. 31, 1942